(12) United States Patent
Schaad

(10) Patent No.: US 9,606,840 B2
(45) Date of Patent: Mar. 28, 2017

(54) ENTERPRISE DATA-DRIVEN SYSTEM FOR PREDICTIVE RESOURCE PROVISIONING IN CLOUD ENVIRONMENTS

(71) Applicant: Andreas Schaad, Karlsruhe (DE)

(72) Inventor: Andreas Schaad, Karlsruhe (DE)

(73) Assignee: SAP SE, Walldorf (DE)

( * ) Notice: Subject to any disclaimer, the term of this patent is extended or adjusted under 35 U.S.C. 154(b) by 298 days.

(21) Appl. No.: 13/928,998

(22) Filed: Jun. 27, 2013

(65) Prior Publication Data
US 2015/0006711 A1    Jan. 1, 2015

(51) Int. Cl.
*H04L 12/26*    (2006.01)
*G06F 9/50*    (2006.01)
*H04L 12/24*    (2006.01)
*H04L 29/08*    (2006.01)

(52) U.S. Cl.
CPC .......... *G06F 9/5072* (2013.01); *H04L 41/069* (2013.01); *H04L 41/147* (2013.01); *H04L 67/1097* (2013.01); *H04L 67/325* (2013.01); *H04L 41/5096* (2013.01)

(58) Field of Classification Search
CPC ......... H04L 47/70; H04L 43/08; H04L 67/32; H04L 47/781; H04L 63/10; H04L 41/0859; H04L 41/147; H04L 41/50; H04L 47/823; H04L 63/1416; H04L 41/5096; H04L 67/1097; H04L 67/325; G06F 17/30575; G06F 9/5011; G06F 9/5072; G06F 21/554; G06F 2209/501; G06F 2209/503; G06F 2209/508; G06F 9/5061; G06F 11/3442; G06F 11/3409; G06F 17/30339; G06F 11/3452; G06F 2209/5019; G06F 8/10; G06F 2209/504; G06F 9/5027; G06F 3/0647; G06Q 10/06; G06Q 10/0631;
(Continued)

(56) References Cited

U.S. PATENT DOCUMENTS

| | | | |
|---|---|---|---|
| 6,308,166 B1 | 10/2001 | Breuker et al. | |
| 6,526,050 B1 * | 2/2003 | Hebert | H04Q 3/002 370/389 |
| 7,308,687 B2 | 12/2007 | Trossman et al. | |

(Continued)

FOREIGN PATENT DOCUMENTS

WO    WO-2013185175 A1    12/2013

OTHER PUBLICATIONS

Ye Hu et al., Resource Provisioning for Cloud Computing, IBM Canada Ltd. 2009, pp. 101-111.
(Continued)

*Primary Examiner* — Kevin Bates
*Assistant Examiner* — Ranjan Pant
(74) *Attorney, Agent, or Firm* — Fish & Richardson P.C.

(57) ABSTRACT

Implementations of the present disclosure include methods, systems, and computer-readable storage mediums for predicting resource consumption in cloud infrastructures. Implementations include actions of receiving event data from one or more enterprise data sources, determining that an event associated with the event data is a known event, retrieving resource consumption information associated with the event, and providing a resource consumption schedule to a cloud infrastructure, the resource consumption schedule indicating resources expected to be consumed during execution of the event.

14 Claims, 4 Drawing Sheets

(58) Field of Classification Search
CPC ........ G06Q 10/06315; G06Q 10/0633; H04W 28/26; H04W 72/0486
See application file for complete search history.

(56) References Cited

U.S. PATENT DOCUMENTS

| | | | | |
|---|---|---|---|---|
| 7,594,006 | B2* | 9/2009 | Rolia | H04L 67/325 709/200 |
| 8,250,135 | B2 | 8/2012 | Driesen et al. | |
| 8,612,180 | B2 | 12/2013 | Li et al. | |
| 8,682,820 | B2 | 3/2014 | Robinson et al. | |
| 8,856,319 | B1* | 10/2014 | Huang | G06F 9/5077 709/224 |
| 9,047,348 | B2* | 6/2015 | Dayan | G06F 11/3006 |
| 2006/0092851 | A1 | 5/2006 | Edlund et al. | |
| 2006/0218278 | A1 | 9/2006 | Uyama et al. | |
| 2007/0129982 | A1 | 6/2007 | Schaad | |
| 2010/0312762 | A1 | 12/2010 | Yan et al. | |
| 2011/0145392 | A1* | 6/2011 | Dawson | G06F 9/5072 709/224 |
| 2011/0295998 | A1 | 12/2011 | Ferris et al. | |
| 2013/0042005 | A1* | 2/2013 | Boss | G06F 9/5011 709/226 |
| 2013/0080617 | A1* | 3/2013 | Driesen | H04L 43/0876 709/224 |
| 2013/0086273 | A1* | 4/2013 | Wray | G06F 9/5072 709/226 |
| 2013/0091285 | A1* | 4/2013 | Devarakonda | G06F 9/4856 709/226 |
| 2013/0268357 | A1* | 10/2013 | Heath | H04L 63/00 705/14.53 |
| 2013/0346390 | A1 | 12/2013 | Jerzak et al. | |
| 2014/0032872 | A1 | 1/2014 | Vasavi et al. | |
| 2014/0055458 | A1 | 2/2014 | Bogdany et al. | |
| 2014/0071814 | A1 | 3/2014 | Landscheidt et al. | |
| 2014/0075004 | A1* | 3/2014 | Van Dusen | H04L 41/04 709/223 |
| 2014/0075016 | A1* | 3/2014 | Chatterjee | H04L 41/5041 709/224 |
| 2014/0082612 | A1* | 3/2014 | Breitgand | G06F 9/45533 718/1 |
| 2014/0207944 | A1* | 7/2014 | Emaru | H04L 47/803 709/224 |
| 2014/0229221 | A1* | 8/2014 | Shih | G06Q 10/06313 705/7.23 |
| 2015/0180949 | A1* | 6/2015 | Maes | H04L 43/10 709/201 |

OTHER PUBLICATIONS

Ralph Mietzner et al., Towards Provisioning the Cloud: On the Usage of Multi-Granularity Flows and Services to Realize a Unified Provisioning Infrastructure for SaaS Applications, In Proceedings of IEEE Congress on Services 2008—Part I, 2008, 8 pages.

Tim Dörnemann et al., On-Demand Resource Provisioning for BPEL Workflows Using Amazon's Elastic Compute Cloud, Department of Mathematics and Computer Science, Univ. of Marburg, 2009, 8 pages.

Eddy Caron et al., Forecasting for Grid and Cloud Computing On-Demand Resources Based on Pattern Matching, IEEE Second International Conference on Cloud Computing Technology and Science, Dec. 2, 2010, 30 pages.

* cited by examiner

ENTERPRISE DATA-DRIVEN SYSTEM FOR PREDICTIVE RESOURCE PROVISIONING IN CLOUD ENVIRONMENTS

BACKGROUND

Cloud service providers provide cloud platforms that include resources available for use by multiple users. In some examples, users can interface with a cloud platform through a client application. Example resources can include storage resources and computational resources. To account for a number of users, cloud platforms should provide such resources in a scalable fashion. In some examples, scalability of a cloud platform can be based on an inexpensive, but massive infrastructure on the cloud service provider's side.

In some examples, if demands of client applications indicate that more resources are required, additional hardware, e.g., processors, memory, can be provisioned by the cloud service provider. In many instances, the provisioning process is unstructured. For example, provisioning of additional resources can be driven by real-time demand, and/or historical information, e.g., seasonal business spikes of online retailers. The result of this unstructured provisioning includes unused resources resulting in higher costs for the consumer, and clients subscribing to service contracts that guarantee more than what the client really consumes.

SUMMARY

Implementations of the present disclosure include methods, systems, and computer-readable storage mediums for predicting resource consumption in cloud infrastructures. Implementations include actions of receiving event data from one or more enterprise data sources, determining that an event associated with the event data is a known event, retrieving resource consumption information associated with the event, and providing a resource consumption schedule to a cloud infrastructure, the resource consumption schedule indicating resources expected to be consumed during execution of the event.

In some implementations, the resource consumption schedule further indicates a time at which or during which the event is to be executed, and a probability that the event will be executed at or during the time.

In some implementations, actions further include normalizing the event data, such that the event data is provided in a format for resource consumption prediction.

In some implementations, determining that an event associated with the event data is a known event includes referencing a deviation table, the deviation table indicating expected behavior associated with the event.

In some implementations, expected behavior includes one or more of expected frequency, expected time intervals between event execution, and one or more event contexts.

In some implementations, actions further include determining that at least one event associated with the event data is an unknown event, and storing the at least one event in a storage table.

In some implementations, the at least one event is included in the resource consumption schedule.

In some implementations, actions further include receiving feedback from the cloud infrastructure, the feedback including resource consumption information associated with the at least one event, and updating a matching table to include the at least one event as a known event, and to include the resource consumption information associated with the at least one event.

In some implementations, actions further include receiving feedback from the cloud infrastructure, the feedback including actual resource consumption information associated with the event.

In some implementations, actions further include updating a matching table based on the actual resource consumption information.

In some implementations, the one or more resources include at least one of storage resources and computational resources.

In some implementations, the enterprise data sources include one or more of a workflow engine, a business object (BO) state machine, a collaboration portal, and an analytics data engine.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to predictive provisioning of resources based on enterprise data. Implementations of the present disclosure will be discussed with reference to resources, e.g., storage resources (memory), computational resources (processors), that are available for consumption on a cloud platform. An example storage resource can include memory allocations in computer-readable/writable memory. An example computational resource can include processing units, e.g., used to execute functionality provided in one or more computer-executable programs. In some examples, the cloud platform can be an enterprise-provided cloud platform, e.g., one or more servers provided by the enterprise for providing the resources. In some examples, the cloud platform can be a cloud platform provided by a third-party service provider, e.g., a third-party that the enterprise contracts with for use of resources. In some examples, users associated with an enterprise can use a computing device, e.g., a smartphone, a tablet computer, a laptop computer, a desktop computer, that can execute client-side applications. The client-side applications can communicate with the cloud platform to consume resources.

In accordance with implementations of the present disclosure, enterprise data is collected and analyzed for predicting resource consumption. In some examples, enterprise data can be received from one or more enterprise data sources, discussed in further detail below. In some examples, the enterprise data is normalized to a format that can be used for resource prediction. In some implementations, a prediction engine processes the enterprise data sources, predicts resource demand, and provides the predicted demand to a cloud service provider. In some implementations, a feedback loop is provided to indicate actual resource consumption, e.g., including actual demand for yet unknown enterprise events.

Figure 1:
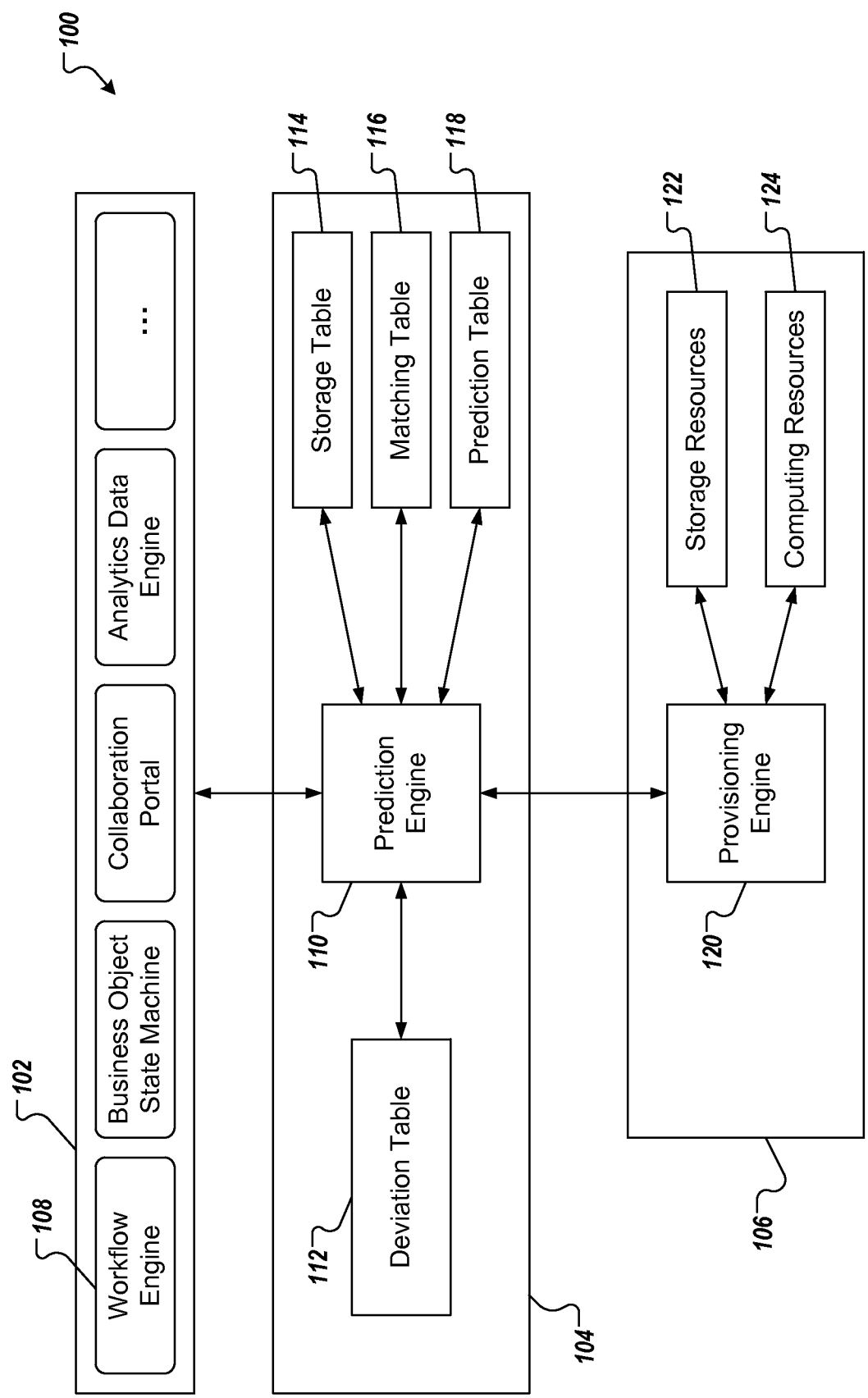
FIG. 1 is a block diagram of an example system architecture in accordance with implementations of the present disclosure.

FIG. 1 depicts an example system architecture 100 in accordance with implementations of the present disclosure. In some implementations, the example system architecture 100 can include enterprise data sources 102, a resource prediction system 104, and a cloud platform 106. As discussed in further detail herein, the resource prediction system 104 can receive enterprise data from the enterprise data sources 102, and can predict resource consumption based on the enterprise data. The resource prediction system 104 can provide the resource prediction, the predicted demand, to the cloud platform 106, and the cloud platform 106 can provision resources based on the resource prediction.

In some examples, the enterprise data sources 102 can be provided as one or more computer-executable programs that can be executed using one or more computing devices, and/or can be provided as one or more data repositories, e.g., databases. In the depicted example, example enterprise data sources 102 include a workflow engine, a business object (BO) state machine, a collaboration portal, and an analytics data engine. Implementations of the present disclosure can be realized using any appropriate enterprise data sources whether explicitly discussed herein.

In some examples, the resource prediction system 104 can be provided as one or more computer-executable programs that can be executed using one or more computing devices, and/or can be provided as one or more data repositories, e.g., databases. In the depicted example, the resource prediction system 104 includes a prediction engine 110, a deviation table 112, a storage table 114, a matching table 116, and a predictions table 118. In some examples, the prediction engine 110 can be provided as one or more computer-executable programs that can be executed using one or more computing devices. In some examples, each of the deviation table 112, the storage table 114, the matching table 116 and the prediction table 118 can each be provided as one or more database tables stored in one or more databases.

In some examples, the cloud platform 106 can be provided as one or more computing devices, e.g., server computing devices, one or more computer-readable storage devices, e.g., memory, and one or more computer-executable programs that can be executed using one or more computing devices. In the depicted example, the cloud platform 106 includes a provisioning engine 120, storage resources 122 and computing resources 124. In some examples, the provisioning engine 120 can be provided as one or more computer-executable programs that can be executed using one or more computing devices. In some examples, the storage resources 122 can include one or more computer-readable storage devices, e.g., memory, that are available, or can be made available for data storage. In some examples, the computing resources 124 can include one or more computing devices, e.g., server computing devices, that are available, or can be made available for data processing.

In general, and as discussed in further detail herein, the resource prediction system 104 can received enterprise data as data objects from the enterprise sources. In some examples, the resource prediction system 104 processes the enterprise data to construct a database (table(s)) of expected occurrences, or events, that consume resources, the likely timing of such occurrences, and the amount of resources each occurrence consumes. As additional enterprise data is made available, the resource prediction system 104 can update the database of expected occurrences. This information can be provided to the cloud platform 106, which can use the information to provision resources.

In further detail, and accordance with implementations of the present disclosure, the prediction engine 110 receives event data from the cloud platform 106. In some examples, the event data includes enterprise events. In some examples, an enterprise event can include an interaction between an enterprise, e.g., a user associated with the enterprise, and the cloud platform 106, e.g., through a client application. In the example context of an enterprise including an online retailer, an example enterprise event can include an order confirmation that is to be sent from the enterprise to a customer. In some examples, an enterprise event consumes resources of the cloud platform 106 for execution. For example, the cloud platform 106 can expend computational resources and/or storage resources to execute at least a portion of an enterprise event.

In some implementations, an enterprise event is provided as a data object. An example event data object can be provided as:

EEV [event_ID, timestamp, event_class, type_ID]

where event_ID is an identifier that is unique to the event, timestamp is associated with a time and date of the occurrence of the event, event_class indicates a class of the event, and type_ID is an identifier associated with a type of the event. In some examples, this information can be used to associate the particular event with a system. For example, the type_ID can identify the event as an automated workflow task, and the event_class can identify the event as being executed as part of a business process model (BPM). Accordingly, and in some examples, enterprise events can relate to application-level activities that have an associated overall class and specific type, e.g., completing a task in a workflow, creating a collaboration room, modeling a database query. This stands in contrast to infrastructure-level events, e.g., opening a port on a webserver.

In some examples, the prediction engine 110 references the matching table 116 to match enterprise events to resource consumption. Accordingly, the prediction engine 110 can reference the matching table 116 to match an enterprise event to storage resources, e.g., memory allocation, and/or computation resources, e.g., processing cycles, that are predicted to be consumed during execution of the enterprise event. In this manner, enterprise events can be matched to discrete values associated with consumable resources. In some examples, enterprise events can require a stepwise refinement to quantify resources that could be consumed. In some examples, enterprise events can indicate a future demand with different levels of probability. For example, the prediction engine 110 can reference the matching table 116 to match an enterprise event to resources, and to receive a probability of the occurrence of the enterprise event.

In further detail, the prediction engine 110 attempts to match an observed EEV with an existing event entry in the matching table 116. In some examples, the matching table can include event entries in the following example format:

MATCH [event_class, mem_c, cpu_c]

which contains information about known classes of events, and associated resource consumption, e.g., average memory allocations consumed (mem_c), average processing units consumed (cpu_c). Accordingly, and in some implementations, the prediction engine 110 receives a data set from the matching table 116 for respective enterprise events. In some examples, the data set includes one or more enterprise classes associated with observed events and, for each event class, one or more resource costs, e.g., memory consumption, processing consumption.

In some examples, observed events can be stored in the storage table 114. For example, observed events can be stored in the storage table in the following example format:

STORE [event_id, normalized, matching]

where normalized indicates a transformation applied to the data, and matching indicates one or more previously observed events, to which the stored observed event corresponds. More particularly, data associated with the event is transformed, also referred to as normalized, into a format that can be used to make a resource prediction. For example, the prediction engine 110 receives enterprise data for a respective enterprise from one or more of the enterprise data sources 102. By normalizing the data, data provided in various formats, e.g., specific to the data source from which it came, can be provided in a format that can be used for prediction. As an example of normalization, an example business process step can be known to trigger execution of a program. In some examples, execution of the program in combination with related business process data results in consumption of processing and memory resources. Such relations between logical (business) events, the realizing programming logic and actual executing hardware are maintained in tables.

In some examples, it can be determined that an observed event does not match a previously observed event. For example, it can be determined that the event class of the observed event does not correspond to any of the event classes provided for in the matching table 116. In such examples, the events can also be stored in the storage table 114.

In some implementations, the prediction engine 110 detects deviations in standard operational enterprise patterns. For example, the prediction engine 110 can detect an increase/decrease in resource consumption of a particular enterprise, e.g., online retailer. In some examples, in response to occurrence of a deviation, the deviation is used to predict required resources. In some examples, one or more threshold can be provided, such that relatively minor deviations are ignored, e.g., as appropriate in the specific context.

In some examples, the prediction engine 110 accesses the deviation table 112 to retrieve deviation information in the following example format:

DEVIATE [event_class, type_ID, avg_frequency, avg_time_intervall, . . . ]

In some examples, the prediction engine 110 can process information retrieved from the deviation table 112 to determine whether an observed set of enterprise events deviate from expected behavior. For example, the prediction engine 110 can determine that a set of events has so far not been observed at all. As another example, the prediction engine 110 can determine that, although the set of events has been previously observed, the set of events has not been observed in a frequency and/or a time interval currently observed. As another example, the prediction engine 110 can determine that, although the set of events has been previously observed, the set of events has not been observed in the currently observed application context. In some examples, the prediction engine 110 can use the information from the deviation table 112 to determine whether events that have not yet occurred are still expected to occur.

By way of example, the prediction engine 110 can receive a set of events from the enterprise data sources 108, and the set of events can include a sub-set of events including enterprise events of the same event class (event_class) and event type (type_ID). In this example, an observed frequency and/or an observed time interval can be determined for the sub-set of events. The prediction engine 110 can access the deviation table 112 to determine, for example, the average frequency and/or the average time interval associated with events having the event class and the event type. Continuing with this example, the observed frequency and/or the observed time interval can be respectively compared to the average frequency and/or the average time interval. In some examples, if the comparison indicates a deviation, e.g., greater than a threshold amount, it can be determined that the observed frequency and/or the observed time interval deviates.

In some implementations, the prediction engine 110 accesses the prediction table 118 to provide a resource prediction. In some examples, the prediction table 118 can store information in the following example format:

PREDICTION [ev_x, ev_c, time, likely, mem_c, cpu_c]

In this example, the prediction table 118 provides a time, a likelihood of occurrence (likely), the estimated memory consumption, and the estimated processor consumption for each event, e.g., in the set of observed event. In some examples, the time can be provided as a discrete time. In some examples, the time can be provided as a time range. In some examples, likely can indicated the likelihood, also referred to as probability, that a corresponding event will occur. In some examples, likely can indicated the likelihood, also referred to as probability, that a corresponding event will occur at or within time.

In some implementations, the information retrieved from the prediction table 118 can be provided, e.g., as predicted resources, to the cloud platform 106, e.g., the provisioning engine 120. Consequently, the cloud platform 106 can provision resources based on the predicted resources.

In some examples, the cloud platform 106 can provide a response, also referred to as feedback, indicating that the cloud platform 106 is able to provision resources to meet the predicted demand. In some examples, this feedback can be used to compare the predicted demand to the actual resource consumption in order to improve future predictions.

Figure 2:
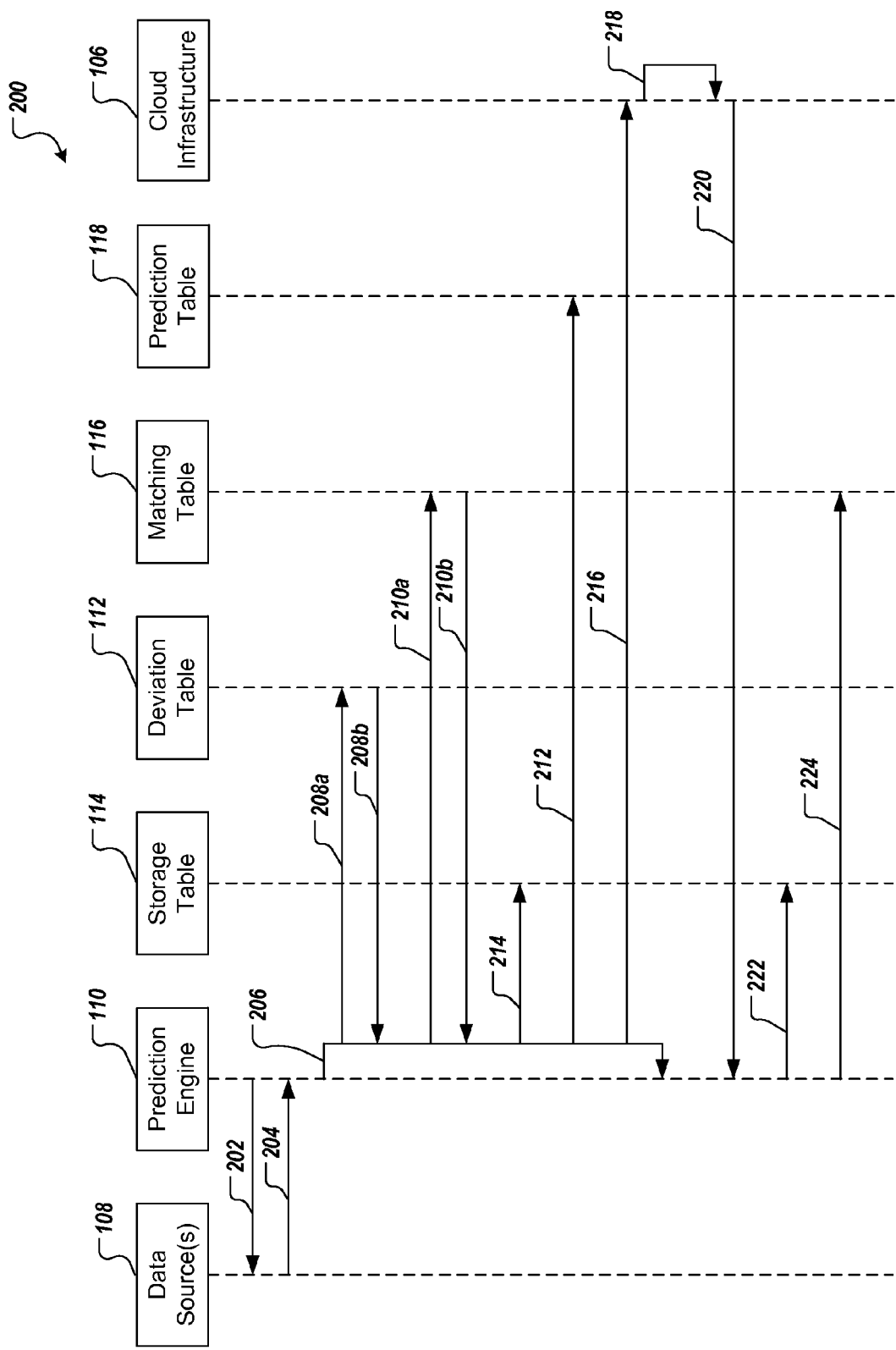
FIG. 2 depicts an example sequence diagram in accordance with implementations of the present disclosure.

FIG. 2 depicts an example sequence diagram 200 in accordance with implementations of the present disclosure. In some examples, the prediction engine 110 polls, for example, sends a request 202 to the enterprise data sources 108 for data, e.g., enterprise events. In some examples, the prediction engine 110 can poll the enterprise data sources 108 at pre-determined intervals. In some examples, the prediction engine 110 can poll the enterprise data sources 108 on demand, e.g., in response to a user request to poll. Each polled data source 108 can send a response 204 including enterprise data, e.g., one or more enterprise events.

The prediction engine 110 receives the enterprise data, and the enterprise data can be normalized. The prediction engine 110 references 208a, 208b the deviation table 112 to determine whether the enterprise data, e.g., the event(s), deviate from known consumption patterns (expected norms). In some examples, it can be determined whether the event data is associated with known events, or whether it is the first time the events have been observed, e.g., the enterprise has added a new system, or extended an existing system. If it is determined that the event data is associated with known events, the enterprise event can be classified based on event type. For example, the prediction engine 110 can reference 210a the matching table 116 based on the class of event, and the matching table can provide 210b resource consumption data associated with events of the event type. More specifically, the prediction engine 110 will find relevant entries in the matching table 116, and will generate and add 212 the detailed expected event, time, probability and resource costs to the prediction table 118.

In some examples, if it is determined that the event data is not associated with known events, the prediction engine 110 can store 214 the event data in the storage table 114. In some examples, the storage table 114 stores enterprise data, for which there are so far no observed resource consumption information.

The prediction engine 110 provides 216 results to the cloud infrastructure 106, which can process the results 218, which can plan resources accordingly. In some examples, the cloud platform provisions resources and provides 220 feedback to the prediction engine 110. In some examples, the feedback can include actually consumed resources per event type. In some examples, the feedback can be associated with event types that were determined to be known. In some examples, the prediction engine 110 can update the matching table based on the feedback, e.g., if the feedback indicates a significant disparity between actual resource consumption and estimated resource consumption provided in the matching table 116. In some examples, the feedback can be associated with event types that were determined to be unknown. In some examples, the prediction engine can delete 222 the previously unknown events from the storage table 114, and can add the previously unknown events and actual resource consumption (provided from the feedback) to the matching table 116.

Figure 3:
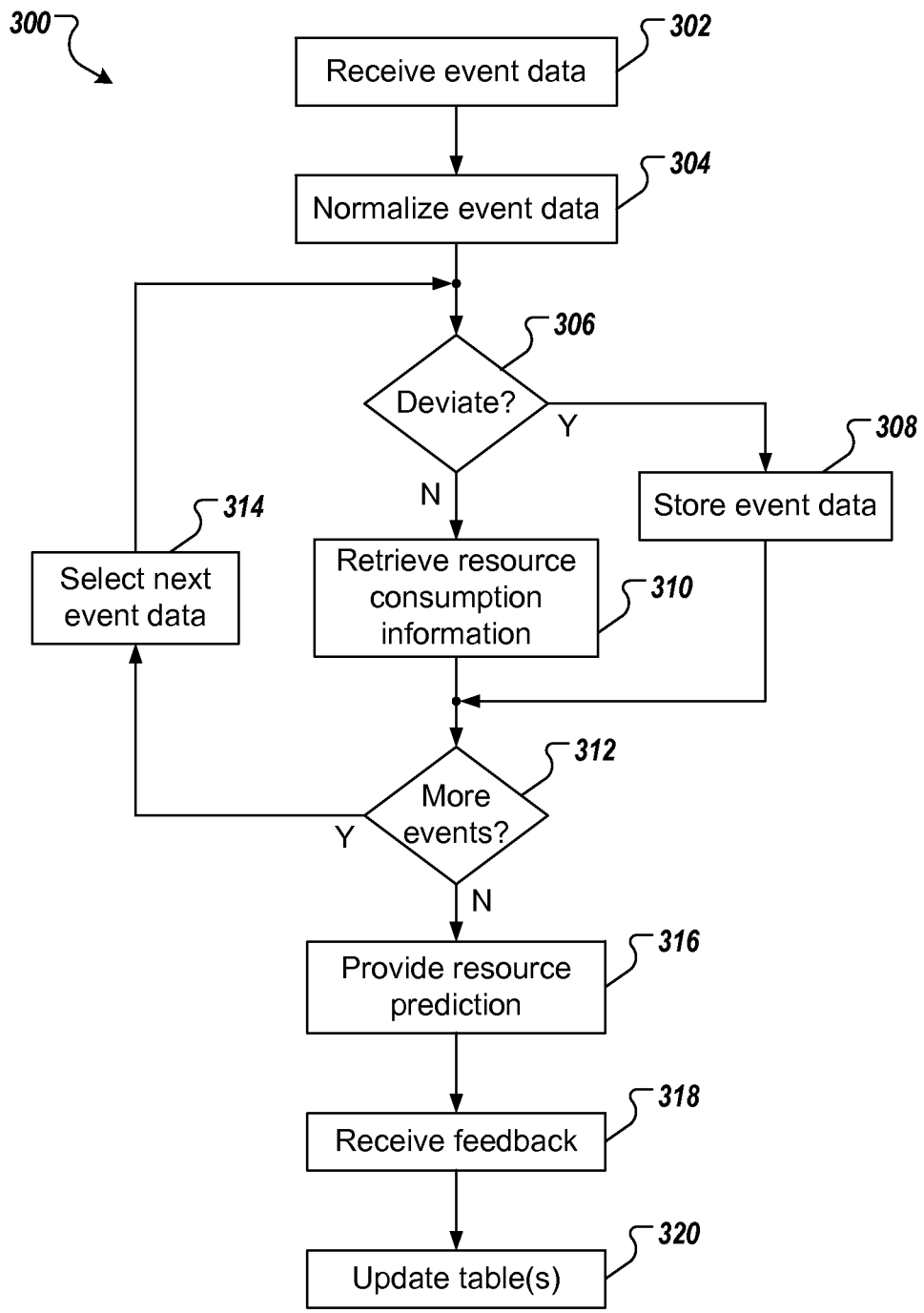
FIG. 3 depicts an example process that can be executed in accordance with implementations of the present disclosure.

FIG. 3 depicts an example process 300 that can be executed in accordance with implementations of the present disclosure. In some implementations, the example process 300 can be implemented using one or more computer-executable programs that can be executed using one or more processors. For example, the example process 300 can be executed within the architecture 100 of FIG. 1.

Event data is received (302). In some examples, the resource prediction system 104 receives event data from enterprise data sources 102. In some examples, the event data is associated with one or more events. Event data is normalized (304). In some examples, the prediction system 104 normalizes the event data, such that the event data is converted from an original format to a format that is appropriate for resource consumption prediction.

It is determined whether event data deviates (306). For example, the deviation table 112 can be referenced to determine whether the event data deviates. In some examples, event data associated with a particular event can be reviewed to determine whether it deviates. In some examples, event data can be determined to deviate, if the particular event has not been previously observed, e.g., the event is an unknown event. In some examples, event data can be determined to deviate, if, although that particular event has been observed, the event has not been observed in the current context and/or frequency, for example. If it is determined that the particular event data deviates, the event data is stored. For example, the event data is stored in the storage table 114. If it is determined that the particular event data does not deviate, resource consumption information is retrieved (310). For example, the resource consumption information associated with the particular event can be retrieved from the matching table 116.

It is determined whether there are more events provided in the event data (312). For example, the event data can be associated with a plurality of events. If it is determined that there are more events, next event data, e.g., associated with another event, is selected (314), and the process 300 loops back. If it is determined that there are no more events, resource prediction information is provided (316). For example, the prediction engine 110 can provide a resource consumption schedule to the cloud infrastructure 106. In some examples, the resource consumption schedule can provide a list of events that are expected to be performed by the cloud infrastructure 106, as well as, for each event, a time, a likelihood (probability) that the event is to be executed at/during the time, and expected resource consumption associated with execution of the event. In some examples, the list of events can include unknown events. Consequently, for an unknown event, the time, the likelihood (probability) that the event is to be executed at/during the time, and/or expected resource consumption associated with execution of the event can be absent.

Feedback is received (318). For example, the resource prediction system 104 can receive feedback from the cloud infrastructure 106. In some examples, the feedback includes a list of events that were performed by the cloud infrastructure 106 and, for each event, actual resources that were consumed to execute the event. In some examples, the feedback and/or list of events includes additional information. One or more tables are updated based on the feedback (320). In some examples, the storage table 114 can be updated by deleting an event that was previously entered as an unknown event, but is now determined to be a known event in view of the feedback. In some example, the matching table 116 can be updated to include the event that was previously determined to be an unknown event. In some examples, the matching table 116 can be updated to revised resource consumption information.

Implementations of the present disclosure can be applicable in one or more use cases. In one example, a customer that seeks to consume resources provided by a cloud provider can contract with the cloud provider. In accordance with implementations of the present disclosure, the customer can predict average and/or peak resource requirements in a dynamic manner, e.g., a real-time, or periodically. For example, the customer can provide the enterprise data-based resource consumption schedule periodically, or in real-time in response to real-time changes to system that the customer operates. The cloud provider can allocate resources to the customer and/or other customers based on the resource consumption schedule. In this manner, the cloud provider can lower infrastructure costs, as unused resources can be minimized.

In some examples, and as discussed herein, the customer bases resource consumption schedule (resource prediction) on available organizational context and enterprise data. For example, a heavily workflow based company can use its workflow models and currently running instantiations to predict that in 2-3 days, more storage capacity is needed. Another example can include that information extracted from company internal collaboration portals can help to predict that in a couple of hours some compute intensive service will be launched. Another example can include that, when a data analyst models a (complex) database query, and the model indicates that more resources will be needed for processing a cloud database. Another example can include monitoring of trading network activities, where information about open tenders and bidding companies already indicates that at some future moment in, time a cloud-based enterprise resource planning (ERP) system will need to provide resources to logically support that business transaction. In view of this, the customer is able to more accurately and efficiently inform the cloud provider of resources required, and in many case, when and for how long the resources are required. This can enable, for example, the customer and the cloud provider to contract for resources on an on-demand basis. That is, instead of the customer contracting for a level of service that would meet peak demands, e.g., a more expensive level of service than what might be needed over an average period, the customer can contract for a level of service that is more congruent to actual resource consumption.

Figure 4:
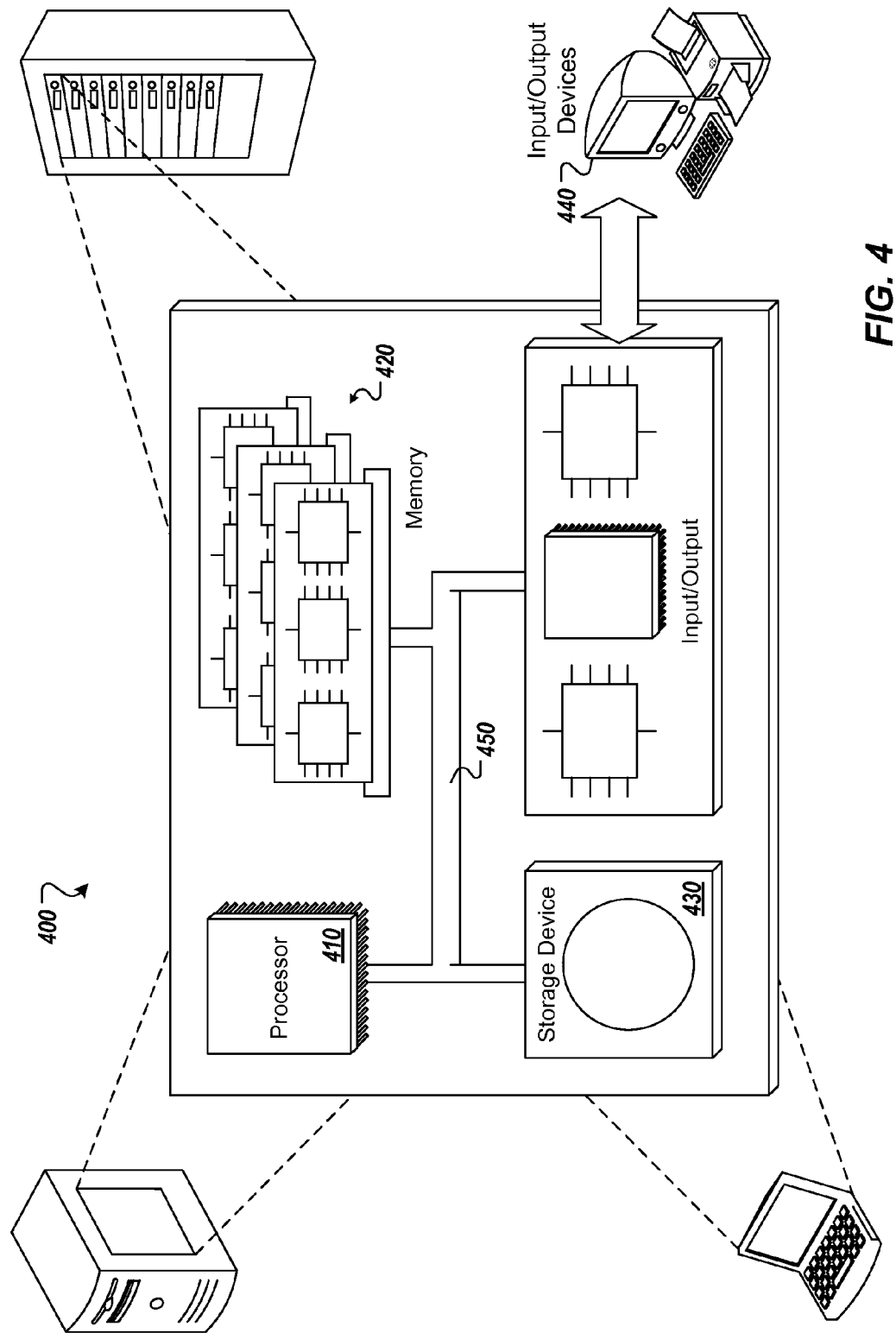
FIG. 4 is a schematic illustration of example computer systems that can be used to execute implementations of the present disclosure.

Referring now to FIG. 4, a schematic diagram of an example computing system 400 is provided. The system 400 can be used for the operations described in association with the implementations described herein. For example, the system 400 may be included in any or all of the server components discussed herein. The system 400 includes a processor 410, a memory 420, a storage device 430, and an input/output device 440. Each of the components 410, 420, 430, 440 are interconnected using a system bus 450. The processor 410 is capable of processing instructions for execution within the system 400. In one implementation, the processor 410 is a single-threaded processor. In another implementation, the processor 410 is a multi-threaded processor. The processor 410 is capable of processing instructions stored in the memory 420 or on the storage device 430 to display graphical information for a user interface on the input/output device 440.

The memory 420 stores information within the system 400. In one implementation, the memory 420 is a computer-readable medium. In one implementation, the memory 420 is a volatile memory unit. In another implementation, the memory 420 is a non-volatile memory unit. The storage device 430 is capable of providing mass storage for the system 400. In one implementation, the storage device 430 is a computer-readable medium. In various different implementations, the storage device 430 may be a floppy disk device, a hard disk device, an optical disk device, or a tape device. The input/output device 440 provides input/output operations for the system 400. In one implementation, the input/output device 440 includes a keyboard and/or pointing device. In another implementation, the input/output device 440 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for predicting resource consumption in cloud infrastructures, the method being executed using one or more processors and comprising:
   receiving, by the one or more processors, event data from one or more enterprise data sources, the event data comprising an interaction between an enterprise and a cloud infrastructure;
   determining, by the one or more processors, that an event associated with the event data is a known event by matching the event with an existing event entry in a matching table using a matching format comprising at least one of a class of the event, an average memory allocation consumed, and an average processing units consumed;
   retrieving, by the one or more processors, resource consumption information associated with the event; and
   providing, by the one or more processors, a resource consumption schedule to the cloud infrastructure, the resource consumption schedule indicating discrete values of a future demand using different levels of probability of the future demand, the future demand being associated with resources expected to be consumed during execution of the event that are quantified based on a stepwise refinement of a time, at which or during which the event is to be executed.

2. The method of claim 1, wherein the resource consumption schedule further indicates a time at which or during which the event is to be executed, and a probability that the event will be executed at or during the time.

3. The method of claim 1, further comprising normalizing the event data, such that the event data is provided in a format for resource consumption prediction.

4. The method of claim 1, wherein determining that an event associated with the event data is a known event comprises referencing a deviation table, the deviation table indicating expected behavior associated with the event.

5. The method of claim 4, wherein expected behavior comprises one or more of expected frequency, expected time intervals between event execution, and one or more event contexts.

6. The method of claim 1, further comprising:
   determining that at least one event associated with the event data is an unknown event; and
   storing the at least one event in a storage table.

7. The method of claim 6, wherein the at least one event is included in the resource consumption schedule.

8. The method of claim 6, further comprising:
   receiving feedback from the cloud infrastructure, the feedback comprising resource consumption information associated with the at least one event; and
   updating a matching table to include the at least one event as a known event, and to include the resource consumption information associated with the at least one event.

9. The method of claim 1, further comprising receiving feedback from the cloud infrastructure, the feedback comprising actual resource consumption information associated with the event.

10. The method of claim 9, further comprising updating a matching table based on the actual resource consumption information.

11. The method of claim 1, wherein the one or more resources comprise at least one of storage resources and computational resources.

12. The method of claim 1, wherein the enterprise data sources comprise one or more of a workflow engine, a business object (BO) state machine, a collaboration portal, and an analytics data engine.

13. A non-transitory computer-readable storage medium coupled to one or more processors and having instructions stored thereon which, when executed by the one or more processors, cause the one or more processors to perform operations for predicting resource consumption in cloud infrastructures, the operations comprising:
   receiving event data from one or more enterprise data sources, the event data comprising an interaction between an enterprise and a cloud infrastructure;
   determining that an event associated with the event data is a known event by matching the event with an existing event entry in a matching table using a matching format comprising at least one of a class of the event, an average memory allocation consumed, and an average processing units consumed;
   retrieving resource consumption information associated with the event; and
   providing a resource consumption schedule to the cloud infrastructure, the resource consumption schedule indicating discrete values of a future demand using different levels of probability of the future demand, the future demand being associated with resources expected to be consumed during execution of the event that are quantified based on a stepwise refinement of a time, at which or during which the event is to be executed.

14. A system, comprising:
   a computing device; and
   a computer-readable storage device coupled to the computing device and having instructions stored thereon which, when executed by the computing device, cause the computing device to perform operations for predicting resource consumption in cloud infrastructures, the operations comprising:
   receiving event data from one or more enterprise data sources, the event data comprising an interaction between an enterprise and a cloud infrastructure;
   determining that an event associated with the event data is a known event by matching the event with an existing event entry in a matching table using a matching format comprising at least one of a class of the event, an average memory allocation consumed, and an average processing units consumed;
   retrieving resource consumption information associated with the event; and
   providing a resource consumption schedule to the cloud infrastructure, the resource consumption schedule indicating discrete values of a future demand using different levels of probability of the future demand, the future demand being associated with resources expected to be consumed during execution of the event that are quantified based on a stepwise refinement of a time, at which or during which the event is to be executed.

\* \* \* \* \*